(12) United States Patent
Srivastava

(10) Patent No.: US 8,918,710 B2
(45) Date of Patent: Dec. 23, 2014

(54) REDUCING PROGRAMMING COMPLEXITY IN APPLICATIONS INTERFACING WITH PARSERS FOR DATA ELEMENTS REPRESENTED ACCORDING TO A MARKUP LANGUAGE

(75) Inventor: Rahul Srivastava, Gurgaon (IN)

(73) Assignee: Oracle International Corporation, Redwood Shores, CA (US)

( * ) Notice: Subject to any disclaimer, the term of this patent is extended or adjusted under 35 U.S.C. 154(b) by 643 days.

(21) Appl. No.: 10/711,791

(22) Filed: Oct. 5, 2004

(65) Prior Publication Data

US 2006/0074838 A1 Apr. 6, 2006

(51) Int. Cl.
G06F 17/00 (2006.01)
G06F 17/22 (2006.01)
G06F 17/30 (2006.01)

(52) U.S. Cl.
CPC ...... *G06F 17/2247* (2013.01); *G06F 17/30908* (2013.01)
USPC .......................................................... 715/234

(58) Field of Classification Search
CPC ........................... G06F 17/2247; G06F 17/272
USPC ............................................. 715/501.1, 513
See application file for complete search history.

(56) References Cited

U.S. PATENT DOCUMENTS

2003/0046317 A1\* 3/2003 Cseri et al. .................... 707/513
2004/0205567 A1\* 10/2004 Nielsen .......................... 715/513
2004/0261019 A1\* 12/2004 Imamura et al. .............. 715/513

OTHER PUBLICATIONS

C.-Y. Chan, P. Felber, M. Garofalakis, R. Rastogi, Efficient filtering of XML documents with XPath expressions, ACM—The VLDB Journal—The International Journal on Very Large Data Bases, vol. 11 Issue 4, New York, pp. 354-379.*

Ping Guo, Julie Basu, Mark Scardina and K.Karun, "Parsing XML Efficiently", Jan. 2004, downloaded at http://www.oracle.com/technology/oramag/oracle/03-sep/o53devxml.html?_template=/ocom/technology/content/print; (7 Pages).

Elliote Rusty Harold, "SAX", Software Development 2000East, Nov. 1, 2000, downloaded at http://www.cafeconleche.org/slides/sd2000east/sax/SAX.html, (43 pages).

Elliote Rusty Harold, "DOM", SD2000 East, Nov. 1, 2000, downloaded at http://www.cafeconleche.org/slides/sd2000east/dom/DOM.html, (43 pages).

Elliote Rusty Harold, "The XMLPULL API", XML.com, downloaded from http://www.xml.com/pub/a/2002/08/14/xmlpull.html, (06 pages); and.

Elliote Rusty Harold, "STAX, An Introduction to stax," XML.com, downloaded from http://www.xml.com/1pt/a/2003/09/17/stax.html, Sep. 17, 2003 (07 pages).

(Continued)

*Primary Examiner* — Adam M Queler
(74) *Attorney, Agent, or Firm* — Narendra Reddy Thappeta

(57) ABSTRACT

According to an aspect of the present invention, a parser provides the portion identifiers (e.g., Xpath(s) in case of XML data files) of at least some of the data elements to the applications. As a result, the applications may be relieved from the task of computing the XPath(s) for various data elements. The implementation of applications may be simplified as a result. In one embodiment, prior API (application programming interface) is extended to provide the XPath(s). In an alternative embodiment, custom API is provided to enable the applications to obtain the XPath(s).

37 Claims, 17 Drawing Sheets

```
601: import javax.xml.parsers.*;
603: import org.xml.sax.*;
605: import org.xml.sax.helpers.*;
606: import java.util.Vector;
607: public class SAXParsingXPath2 extends DefaultHandler {
609:   public static void main(String[] args) throws Exception {
611:     SAXParserFactory spf = SAXParserFactory.newInstance();
613:     SAXParser sp = spf.newSAXParser();
615:     SAXParsingXPath2 handler = new SAXParsingXPath2();
616:     sp.parse("file:///D:\\pats\\something.xml", handler);
617:     for (int i=0; i<xpaths.size(); i++) {
618:       System.out.println("XPath="+xpaths.get(i));
619:     }
620: }
621: public void startElement(String uri, String localName, String qName, Attributes   attributes, String xpath) {
623:   System.out.println("Start Element="+qName);
625:   xpaths.add(xpath);
627: }
629: public void characters(char[] ch, int start, int length, String xpath) {
631:   String text = new String(ch, start, length);
633:   xpaths.add(xpath);
635: }
637: public void endElement(String uri, String localName, String qName, String xpath) {
639:   System.out.println("End Element="+qName);
643: }
645: }
```

(56) References Cited

OTHER PUBLICATIONS

Reference Linking for Journal Articles, Priscilla Caplan and William Y. Arms, D-Lib Magazine, Jul./Aug. 1999, vol. 5 No. 7/8; ISSN 1082-9873, XP-002322864.

Digital Libraries and Autonomous Citation Indexing, Steve Lawrence, C. Lee Giles, and Kurt Bollacker, Research Feature, Jun. 1999, XP-000829616.

Reference Linking with DOIs, A Case Study, D-Lib Magazine, Feb. 2000, vol. 6 No. 2, ISSN 1082-9873, XP-002322865.

Developing Services for Open Eprint Archives: Globalisation, Integration and the Impact of Links, Steve Hitchcock, Les Carr, Zhuoan Jiao, Donna Bergmark, Wendy Hall, Carl Lagoze, and Stevan Harnad, Multimedia Research Group, Department of Electronics and Computer Science, University of Southampton, SO17 1BJ, UK, 2000.

Citation Linking: Improving Access to Online Journals, S. Hitchcock, L. Carr, S. Harris, M.N. Hey and W. Hall, Open Journal Project, Multimedia Research Group, Department of Electronics and Computer Science, University of Southampton, Southhampton SO17 1BJ, United Kingdom, XP-002322867, 1997.

A Universal Citation Database as a Catalyst for Reform in Scholarly Communication, by Robert D. Cameron, XP-002322868, 1997.

Persistence of Information on the web: Analyzing citations contained in research articles, Steve Lawrence, Frans Coetzee, Eric Glover, Gary Flake, David Pennock, Bob Krovetz, Finn Nielsenn, Andries Kruger, and Lee Giles, NEC Research Institute, 4 Independence Way, Princeton, NJ 08540, XP-002322869, 2000.

\* cited by examiner

```
401: <?xml version="1.0" encoding="US-ASCII"?>
402: <Books>
403:   <Book isbn="123">
404:     <Name>Sherlock Holmes-I</Name>
405:     <Author>Arthur Conan Doyle</Author>
406:   </Book>
407:   <Book isbn="456">
408:     <Name>Sherlock Holmes-II</Name>
409:     <Author>Arthur Conan Doyle</Author>
410:   </Book>
411:   <Book isbn="789">
412:     <Name>Sherlock Holmes-III</Name>
413:     <Author>Arthur Conan Doyle</Author>
414:   </Book>
415: </Books>
```

*FIG. 4A*

| Node (420) | XPath (440) |
|---|---|
| Books | /Books |
| Book | /Books/Book[1] |
| isbn="123" | /Books/Book[1]/@isbn |
| Name | /Books/Book[1]/Name |
| Author | /Books/Book[1]/Author |
| Book | /Books/Book[2] |
| isbn="456" | /Books/Book[2]/@isbn |
| Name | /Books/Book[2]/Name |
| Author | /Books/Book[2]/Autho |
| Book | /Books/Book[3] |
| isbn="789" | /Books/Book[3]/@isbn |
| Name | /Books/Book[3]/Name |
| Author | /Books/Book[3]/Author |

FIG. 4B

```
501:  import javax.xml.parsers.*;

505:  import org.w3c.dom.*;

507:  import java.util.Vector;

508:  public class DOMParsing {

509:    static Vector xpaths= new Vector();

511:    public static void main(String[] args) throws Exception {

513:      DocumentBuilderFactory dbf = DocumentBuilderFactory.newInstance();

517:      DocumentBuilder db = dbf.newDocumentBuilder();

520:      Document doc = db.parse("file:///D:\\something.xml");

522:      traverse(doc);

523:      for (int i=0; i<xpaths.size(); i++) {
524:        System.out.println("XPath="+xpaths.get(i));
525:      }
528:    }
529:  }
```

*FIG. 5A*

```
550: private static void traverse(Node node) {
555:    xpaths.add(node.getXPath());
560:    if (node.getNodeType() == Node.DOCUMENT_NODE) {
561:       traverse(((Document)node).getDocumentElement());
562:    }
571:    if (node.getNodeType() == Node.ELEMENT_NODE) {
572:       NodeList nodes = node.getChildNodes();
581:       for(int i = 0; i < nodes.getLength(); i++) {
582:          traverse(nodes.item(i));
583:       }
584:    }
586:    else if (node.getNodeType() == Node.TEXT_NODE) {
587:       String str = node.getNodeValue();
589:    }
590: }
591: }
```

*FIG. 5B*

```
601: import javax.xml.parsers.*;
603: import org.xml.sax.*;
605: import org.xml.sax.helpers.*;
606: import java.util.Vector;
607: public class SAXParsingXPath2 extends DefaultHandler {
609:    public static void main(String[] args) throws Exception {
611:        SAXParserFactory spf = SAXParserFactory.newInstance();
613:        SAXParser sp = spf.newSAXParser();
615:        SAXParsingXPath2 handler = new SAXParsingXPath2();
616:        sp.parse("file:///D:\\pats\\something.xml", handler);
617:        for (int i=0; i<xpaths.size(); i++) {
618:            System.out.println("XPath="+xpaths.get(i));
619:        }
620: }
621: public void startElement(String uri, String localName, String qName, Attributes attributes, String xpath) {
623:    System.out.println("Start Element="+qName);
625:    xpaths.add(xpath);
627: }
629: public void characters(char[] ch, int start, int length, String xpath) {
631:    String text = new String(ch, start, length);
633:    xpaths.add(xpath);
635: }
637: public void endElement(String uri, String localName, String qName, String xpath) {
639:    System.out.println("End Element="+qName);
643: }
645: }
```

FIG. 6

```
701: import java.io.*;
702: import javax.xml.stream.*;
703: import javax.xml.stream.events.*;
704: import java.util.Vector;
705: public class PullParsingXPath {

706: static Vector xpaths = new Vector();

707: public static void main(String args[]) throws Exception {

708:   FileInputStream xmlFile = new FileInputStream("D:\Rahul\pats\something.xml");
709:   XMLInputFactory xif = XMLInputFactory.newInstance();
710:   XMLStreamReader pullParser = xif.createXMLStreamReader(xmlFile);

711:   while(pullParser.hasNext()) {

712:     int eventType = pullParser.next();
713:     xpaths.add(pullParser.getXPath());
715:     if (eventType == XMLEvent.START_ELEMENT) {
716:       System.out.print("<"+pullParser.getName()+">");
717:     }
718:     else if (eventType == XMLEvent.CHARACTERS) {
719:       System.out.print(pullParser.getText());
720:     }
721:     else if (eventType == XMLEvent.END_ELEMENT) {
722:       System.out.print("</"+pullParser.getName()+">");
724:     }

725:   }
730:   for (int i=0; i<xpaths.size(); i++) {
731:     System.out.println("XPath="+xpaths.get(i));
732:   }

| XPathParserFactory | |
|---|---|
| XPathParserFactory | newInstance() — 811 |
| XPathPushParser | createXPathPushParser() — 812 |
| boolean | hasFeature(String feature) — 813 |
| void | setFeature(String feature, Boolean val) — 814 |
| boolean | getFeature(String feature) — 815 |
| void | setProperty(String property, Object val) — 816 |
| Object | getProperty(String property) — 817 |

FIG. 8A

| XPathPushParser | |
|---|---|
| void | setXpathContentHandler(XpathContentHandler) — 821 |
| Xpath ContentHandler | getXpathContentHandler() — 822 |
| void | setErrorHandler(Errorhandler handler) — 823 |
| ErrorHandler | getErrorHandler() — 824 |
| void | parse(InputSource xmlSource) — 825 |

FIG. 8B

| XPathContentHandler | |
|---|---|
| void | startDocument() — 841 |
| void | emit(String xpath, String xpathVal, int eventType, NamespaceResolver nsResolver) — 842 |
| void | emit(String xpath, String xpathVal, int eventType, XPathAttributes attrs, NamespaceResolver nsResolver) — 843 |
| void | endDocument() — 844 |

FIG. 8C

| NamespaceResolver |
|---|
| String | resolveNamespacePrefix(java.lang.String prefix) ~861 |

FIG. 8D

| XPathAttributes | |
|---|---|
| int | getLength() ~871 |
| XPathAttribute | item(int index) ~872 |

FIG. 8E

| XPathAttribute | |
|---|---|
| String | getXPath() ~891 |
| String | getValue() ~892 |

FIG. 8F

```
901: import javax.xml.parsers.*;
902: import org.xml.sax.*;
903: import org.xml.sax.helpers.*;
904: import java.util.Vector;
905: public class PushParsingXPath implements XPathContentHandler
906: static Vector xpaths = new Vector();
907: public static void main(String[] args) throws Exception {
908: XPathParserFactory xpf = XPathParserFactory.newInstance();
909: XPathPushParser xpp = xpf.createXPathPushParser();
910: xpp.setFeature("http://xpath-parser/features/abbreviated-xpath", false);
911: xpp.setFeature("parser.xpath.attributes", true);
912: XPathContentHandler xpcHandler = new MyContentHandler();
913: xpp.setContentHandler(xpcHandler);
914: XPathErrorHandler xpeHandler = new MyErrorHandler();
915: xpp.setErrorHandler(xpeHandler);
917: InputSource is = new InputSource("file:///d:\\xpath\\samples\\abc.xml");
919: xpp.parse(is);
920: }
921: public void emit(String xpathExpr, String xpathVal, int eventType, NamespaceResolver nsResolver) {
923:     xpaths.add(xpathExpr);
925: }
927: public void emit(String xpathExpr, String xpathVal, int eventType, XPathAttributes attrs, NamespaceResolver nsResolver) {
929:     xpaths.add(xpathExpr);
931: }
933: }
```

FIG. 9

| Node (1010) | XPath (1020) | Value (1030) |
|---|---|---|
| Books | /Books | null |
| Book | /Books/Book[1] | null |
| isbn="123" | /Books/Book[1]/@isbn | 123 |
| Name | /Books/Book[1]/Name | Sherlock Holmes- I |
| Author | /Books/Book[1]/Author | Arthur Conan Doyle |
| Book | /Books/Book[2] | null |
| isbn="456" | /Books/Book[2]/@isbn | 456 |
| Name | /Books/Book[2]/Name | Sherlock Holmes- II |
| Author | /Books/Book[2]/Author | Arthur Conan Doyle |
| Book | /Books/Book[3] | null |
| isbn="789" | /Books/Book[3]/@isbn | 789 |
| Name | /Books/Book[3]/Name | Sherlock Holmes- III |
| Author | /Books/Book[3]/Author | Arthur Conan Doyle |

| Node (1051) | XPath (1052) | Value (1053) | XPathAttributes (1054) | |
|---|---|---|---|---|
| Books | /Books | null | | 1061 |
| Book | /Books/Book[1] | null | @isbn, 123 | 1062 |
| Name | /Books/Book[1]/Name | Sherlock Holmes - I | | 1063 |
| Author | /Books/Book[1]/Author | Arthur Conan Doyle | | 1064 |
| Book | /Books/Book[2] | null | @isbn, 456 | 1065 |
| Name | /Books/Book[2]/Name | Sherlock Holmes - II | | 1066 |
| Author | /Books/Book[2]/Author | Arthur Conan Doyle | | 1067 |
| Book | /Books/Book[3] | null | @isbn, 789 | 1068 |
| Name | /Books/Book[3]/Name | Sherlock Holmes- III | | 1069 |
| Author | /Books/Book[3]/Author | Arthur Conan Doyle | | 1070 |

*FIG. 10B*

| Node | XPath | Value | XPathAttributes |
|---|---|---|---|
| Books | /child::Books | null | |
| Book | /child::Books/child::Book[1] | null | attribute::isbn, 123 |
| Name | /child::Books/child::Book[1]/child::Name | Sherlock Holmes-I | |
| Author | /child::Books/child::Book[1]/child::Author | Arthur Conan Doyle | |
| Book | /child::Books/child::Book[2] | null | attribute::isbn, 456 |
| Name | /child::Books/child::Book[2]/child::Name | Sherlock Holmes-II | |
| Author | /child::Books/child::Book[2]/child::Author | Arthur Conan Doyle | |
| Book | /child::Books/child::Book[3] | null | attribute::isbn, 789 |
| Name | /child::Books/child::Book[3]/child::Name | Sherlock Holmes-III | |
| Author | /child::Books/child::Book[3]/child::Author | Arthur Conan Doyle | |

FIG. 10C

| Node | XPath | Value | XPathAttributes |
|---|---|---|---|
| Books | /child::Books | null | | 
| Book | /child::Books/child::Book[1] | null | |
| isbn="123" | /child::Books/child::Book[1]/attribute::isbn | 123 | |
| Name | /child::Books/child::Book[1]/child::Name | Sherlock Holmes-I | |
| Author | /child::Books/child::Book[1]/child::Author | Arthur Conan Doyle | |
| Book | /child::Books/child::Book[2] | null | |
| isbn="123" | /child::Books/child::Book[1]/attribute::isbn | 123 | |
| Name | /child::Books/child::Book[2]/child::Name | Sherlock Holmes-II | |
| Author | /child::Books/child::Book[2]/child::Author | Arthur Conan Doyle | |
| Book | /child::Books/child::Book[3] | null | |
| isbn="123" | /child::Books/child::Book[1]/attribute::isbn | 123 | |
| Name | /child::Books/child::Book[3]/child::Name | Sherlock Holmes-III | |
| Author | /child::Books/child::Book[3]/child::Author | Arthur Conan Doyle | |

FIG. 10D

REDUCING PROGRAMMING COMPLEXITY IN APPLICATIONS INTERFACING WITH PARSERS FOR DATA ELEMENTS REPRESENTED ACCORDING TO A MARKUP LANGUAGE

BACKGROUND OF THE INVENTION

1. Field of the Invention

The present invention relates to applications programming environment using markup languages such as XML, and more specifically to reducing programming complexity in applications interfacing with parsers for data elements represented according to a markup languages.

2. Related Art

Markup languages such as XML are generally used to represent various data of interest. A typical markup language generally contains tags which indicate one or more of various aspects such as what the data represents or how the data is to be displayed, etc. For example, in XML, relevant data is enclosed between a start tag and an end tag, indicating what the enclosed data represents. The relevant data and the tags are referred to as data elements in the present application.

Applications, which require data represented according to markup languages, often interface with a parser for the various data elements of interest. In a typical scenario, the XML data is stored in an XML data file, and the parser retrieves the data elements and provides the retrieved elements to the applications according to a pre-specified approach.

According to one pre-specified approach often referred to as 'pull parsing', an application generally requests that the 'next' data element be provided. In response, a parser retrieves (e.g., from an XML document) the next data element (in sequential order) from the XML data file and provides the next data element to the application. Since the data elements are generally retrieved in sequential order, the parsers are referred to as sequential parsers.

According to another sequential parsing approach, often referred to as 'push parsing', a parser retrieves data elements in an XML data file without necessarily receiving a request for a next data element, and "pushes" the retrieved data element to the application (after the application has specified the file identifier of the XML data file). The applications are designed to process such data elements received from the push-based parsers. SAX and XNI are the two industry standards, which support push parsing.

The pull and push based parses are broadly referred to as event based parsers since the requests (from application) of pull parsing and the pushing of data elements in push parsing can be viewed as events. It may be appreciated that the data elements are provided one at a time in event based parsing techniques.

In another broad prior approach, commonly referred to as 'Object based parsing', the parser generally creates a hierarchical representation of data elements in an XML data file while parsing the XML data file and saves the hierarchical representation (in the form of a data structure) of the data elements into a random access memory (RAM) which is accessible to the application. The memory resident data structure is referred to as DOM (Document Object Model). The object based parsers return the DOM to the application, typically after parsing of the XML data file is complete. Thus, the applications are designed to access the RAM for any desired data element thereafter. Two commonly used DOM standards are W3C DOM and J-DOM.

An advantage of the object based parsing over the event parsers is that the data elements are available quickly to the applications. However, the memory (RAM) requirements are substantially more since a data structure representing the entire XML data file may be saved in the RAM.

Applications often require an identifier ("portion identifier") of portions (containing one or more data elements) of a data file. In the case of XML, the portion identifier is referred to as an XPATH, and is defined in a hierarchical fashion similar to the file paths in various computer systems. The portion identifier may be required, for example, to determine a parent/ancestor of a data element. As an illustration, assuming that an XML data file contains data related to a school and that a retrieved data element corresponds to the name of a student of a section, and it is desirable to determine the teacher of the section. The name of the teacher may be structured as an ancestor of the retrieved data element, and accordingly it may be desirable for an application to have the XPath of the name of the student.

In a prior approach, applications may include program logic to build/construct XPath (or portion identifier, in general) of such desired parts of an XML data file. The need to build such portion identifiers of data elements of interest generally adds to the programming complexity of applications. At least for such a reason, there is a general need to reduce programming complexity in applications interfacing with parsers for data elements represented according to markup languages.

BRIEF DESCRIPTION OF THE DRAWINGS

The present invention will be described with reference to the accompanying drawings briefly described below.

FIG. 4 contains XML data used to illustrate the operation of example embodiments implemented according to various features of the present invention.

FIG. 5A contains Java code providing an outline for the implementation of an application interfacing with an object-based parser, which provides portion identifiers according to various aspects of the present invention.

FIG. 5B contains Java code illustrating the manner in which the output data structure generated by an object-based parser can be accessed by an application.

FIG. 6 contains Java Code for an application interfacing with a event-based push parser (e.g., SAX parser) according to an aspect of the present invention.

FIG. 7 contains Java Code for an application interfacing with an event-based pull parser according to an aspect of the present invention.

FIGS. 8A-8F are shown containing tables illustrating a custom application programming interface (API) provided by an example parser in an alternative embodiment of the present invention.

FIG. 9 illustrates the manner in which the APIs of FIGS. 8A-8F can be used to implement applications according to various aspects of the present invention.

FIGS. 10A, 10B, 10C and 10D illustrate the XPaths and values returned by parsers providing the API of FIGS. 8A-8F in an embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

In an embodiment of the present invention, a parser provided determines identifiers ("portion identifiers") of at least some portions of XML data provided to an application, and makes the portion identifiers available to the application. As a result, the application may not need to construct the portion identifiers of various portions of the XML data of interest, and the programming complexity of applications can be reduced as a result.

In the case of event-based parsers, the portion identifiers can be provided along with the data elements as parameters of a single procedure call. In the case of object-based parsers, the portion identifiers can be made available in the data structures (random access memory) from which applications typically access the data elements. In alternative embodiments, additional procedure calls (often referred to as function calls) can be used to provide the portion identifiers, as described below with examples.

A parser may construct the portion identifiers while parsing the XML data files. By constructing the portion identifiers while parsing the data files, the implementation of parsers also can be simplified.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
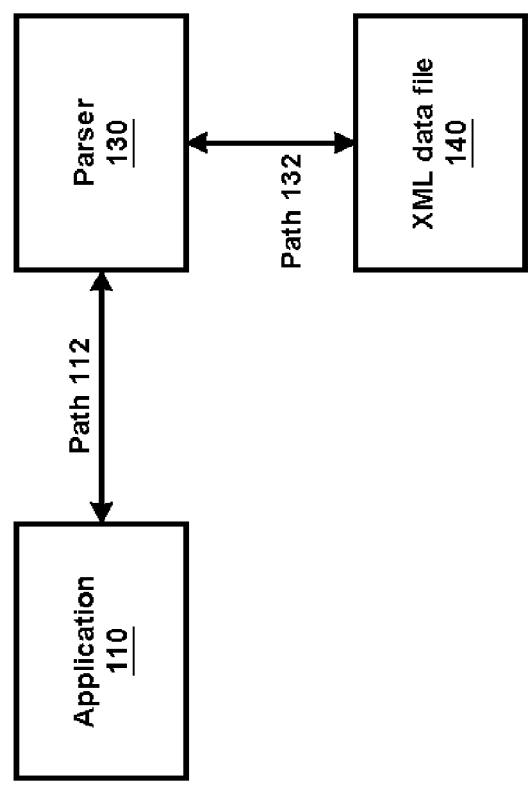
FIG. 1 is a block diagram illustrating the details of a general approach using which various aspects of the present invention are implemented in one embodiment.

FIG. 1 is a block diagram illustrating an example environment in which various aspects of the present invention can be implemented. Application 110 is shown interfacing with parser 130 for data elements stored in XML data file 140. Application 110 generally processes the data elements provided by parser 130. Parser 130 represents an example parser, which simplifies the implementation of application 110.

Various example embodiments described below can be implemented on workstations/servers/systems available from vendors such as Sun Microsystems, IBM, and Dell supporting the JAVA application environment. Java concepts are described in further detail in a book entitled, "Java™. The Complete Reference, Fifth Edition" by Herbet Schildt, ISBN Number: 0-07-049543-2.

Application 110 generally needs to be implemented consistent with the interface (shown as 112) provided by parser 130. Parser 130 can be implemented by modifying any of the parsers (e.g., the event-based and object based parsers noted above in the background section) available in the marketplace to implement various aspects of the present invention. Alternatively, custom API (application programming interface) may be defined to suitably provide the XPaths associated with various data elements.

Some example interfaces (shown as path 112) between applications and parsers, and the manner in which the interfaces can be implemented is described below with examples. First, the manner in which parser 130 and application 110 operate according to several aspects of the present invention is described below first.

3. Operation of Parser

Figure 2:
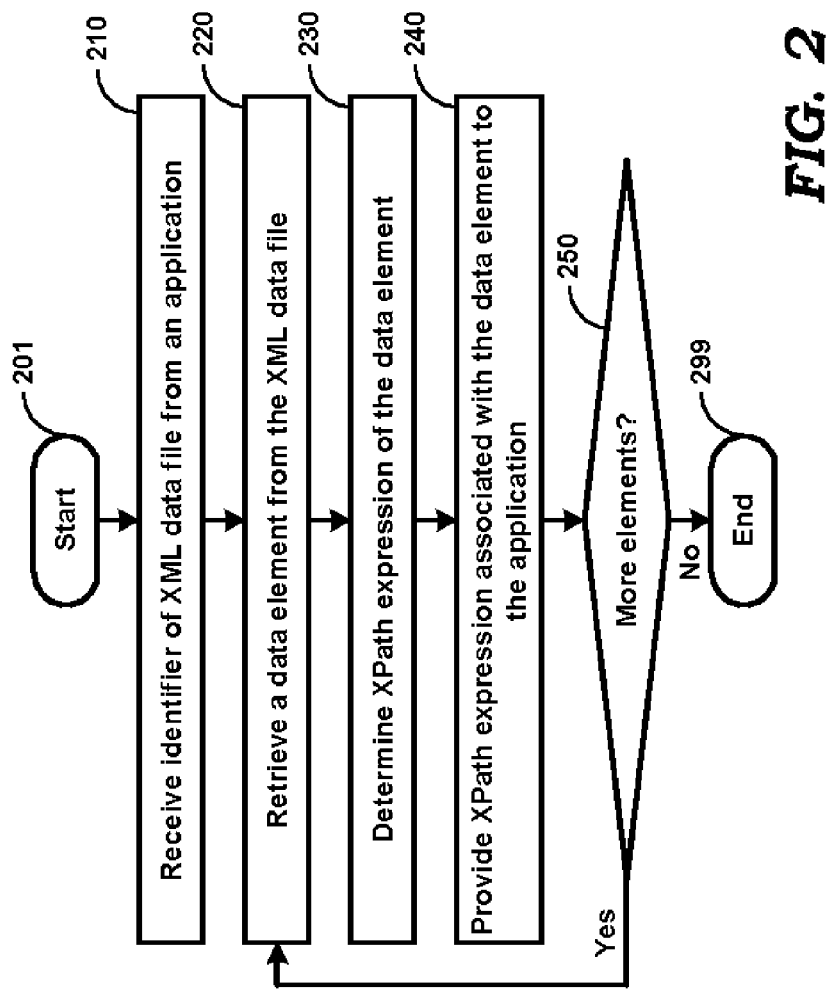
FIG. 2 is a flow chart illustrating the manner in which a parser of a data file (containing data according to a markup language) can be implemented to simplify the implementation of applications according to an aspect of the present invention.

FIG. 2 is a flow chart illustrating the manner in which a parser may operate according to various aspects of the present invention. The flow chart is described with reference to FIG. 1 merely for illustration. The flow chart begins in step 201 and control immediately passes to step 210.

In step 210, parser 130 may receive the identifier ("file identifier" to distinguish from the portion identifiers of portions data file) of an XML data file from an application. It should be appreciated that the file represents any data source (whether or not stored in secondary medium) and the file identifier identifies the data source.

In the example environment of FIG. 1, parser 130 receives the file identifier of XML data file 140 from application 110 according to interface 112. Parser 130 may identify the XML data file 140 in the corresponding operating environment (e.g., Sun server with Java application environment), based on the received file identifier.

In step 220, parser 130 retrieves a data element from the XML data file. In general, the retrieval needs to be consistent with the medium and access mechanism by which the data in the XML data file can be accessed, and the retrieval may be performed in a known way.

In step 230, parser 130 determines XPath expression of the data element. In an embodiment, the loop of steps 220-250 is executed for each data element in the XML data file. The data elements are retrieved sequentially from the XML data file, and the XPath may be computed as each data element is retrieved. The content of the XML data file can be used in determining the XPath expression. The XPath expression can also be computed in a known way.

Continuing with FIG. 2, in step 240, parser 130 may provide XPath expression associated with the data element to the application. The XPath expression may be provided using various interfaces (112). In an embodiment described below, a parser using an event-based parsing technique provides XPath to the application as a parameter while providing corresponding data element. In another embodiment below, parser 130 using object-based parsing technique provides Xpath expression in the data structure representing XML data file 140 in RAM.

In yet another approach described below, parser 130 provides XPath of each data element using API procedure calls defined according to various aspects of the present invention. In the case of data elements having data values, the data value is contained in the provided XPath. Each of the approaches is described in further detail below.

In step 250, a determination may be made as to whether there are additional data elements to be provided to the application. Control passes to step 220 if such additional data elements are present, and to step 299 otherwise. The flow chart of FIG. 2 ends in step 299. It may thus be appreciated that the flow chart of FIG. 2 operates to provide XPath expressions associated with at least some data elements to applications. The description is continued with respect to the operation of application 110 in view of the availability of the XPath expressions.

4. Operation of an Application

Figure 3:
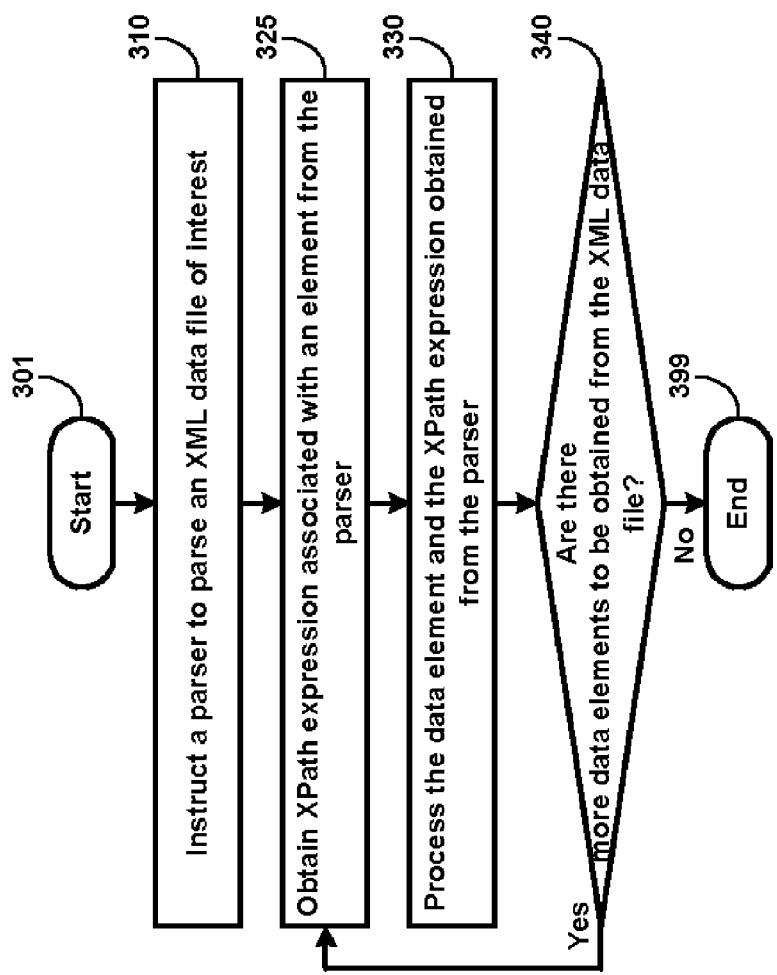
FIG. 3 is a flow chart illustrating the manner in which the implementation of applications is simplified according to an aspect of the present invention.

FIG. 3 is a flow chart illustrating the manner in which an application may operate according to various aspects of the present invention. The flow chart is described with reference to FIG. 1 merely for illustration. The flow chart begins in step 301 and control immediately passes to step 310.

In step 310, application 110 instructs a parser to parse an XML data file of interest. With reference to FIG. 1, application 110 may specify an identifier of XML data file 140 while instructing parser 130. Any other initialization tasks, as necessary for the specific operating environment, may also be performed as a part of such instruction. In general, the instruction causes parser 130 to provide data elements contained in the specified data file to application 110.

In step 325, application 110 obtains XPath expression associated with an element from the parser. In embodiments described below, the XPath expression is obtained with respect to at least all the data elements, which have corresponding data values. However, alternative embodiments can be implemented in which XPath expressions are obtained in association with only some of the data elements of interest (e.g., by having the applications indicate such data elements of interest).

In step 330, application 110 may process the data element and XPath expression obtained from the parser. Such processing generally depends on the 'business logic' sought to be implemented by application 110. The XPath expression may be conveniently used to simplify the implementation of such business logic.

In step 340, application 110 determines if there are more elements to be obtained from XML data file. Control passes to step 325 if there are more elements to be obtained, and otherwise control passes to step 399, in which the flow chart ends. It may be appreciated that the implementation of applications can be simplified due to the availability of XPath. The description is continued with reference to an example illustrating the various XPaths provided to an application in the context of an example data file.

5. XPaths for an Example XML Data File

FIG. 4A depicts the contents of a XML data file containing 15 lines, numbered 401-415. The XPaths provided corresponding to the data elements in the 15 lines are depicted in the table of FIG. 4B.

FIG. 4B is shown containing a table having 2 columns 420 and 440. Column 420 is shown containing data elements for corresponding data in the XML data file of FIG. 4A and column 440 is shown containing XPath of the data elements of column 420. For example, in row 421, XPath of data element 'Books' (under column 440) from the root is shown as /Books for the corresponding data shown in lines 402 and 415 of FIG. 4A.

Lines 422-425 contain XPaths for the corresponding four data elements of lines 403-406 respectively. Similarly, lines 426-429 and 430-433 represent XPaths for the data elements of lines 407-410 and 411-414 respectively. An XPath/books/book would represents the data portion corresponding to all the three book elements.

It may be appreciated that the XPaths thus generated can be made available to applications using different interfaces, as described below. The description is continued with reference to an approach in which the interfaces provided by some prior parsers can be extended to provide the XPath expressions.

6. Extensions to DOM Parsers

As noted above, DOM parser represents an object-based parser. DOM parser provides a pre-specified interface using which applications can obtain data elements from a data file of interest. DOM parser is described in a document entitled, "Effective XML" by Elliotte Rusty Harold, available from Addison-Wesley Professional, ISBN: 0321 504 06 The manner in which such a parser can be modified is illustrated below with reference to FIG. 5A.

FIG. 5A is shown containing Java code providing an outline for the implementation of an application interfacing with an object-based parser which provides portion identifiers (XPaths in this example) according to various aspects of the present invention. The pseudo-code is also used to illustrate the modifications may need to be performed to DOM parser to support various features of the present invention.

Lines 501, 505 and 507 are respectively shown importing the classes in a java application code, available in java.xml.parsers.*, org.w3c.dom.*, and java.util.Vector respectively. The package org.w3c.doc contains functions for accessing (traversing, modifying, creating) a (data structure) DOM according to W3C standards.

Line 508 defines class DOM parsing as being public, and the corresponding body (of the class) is contained in lines 511-528, as shown. Line 509 defines a variable 'xpaths' as a vector. The xpaths variable is then used to store XPath, as described below.

Line 511 causes the execution of the code corresponding to lines 513-526 to be executed. Line 513 initiates a new instance of the DOM parser, and the corresponding handle is saved in variable dbf. In line 517, the factory instantiates the underlying registered DOM parser, and returns the pointer of the DOM parser class.

Line 520 specifies the file identifier of the XML data file to be parsed. Thus, the code of lines 513, 517 and 520 together perform the necessary initializations and completing instructing the DOM parser to parse a data file of interest.

In response, DOM parser provided/modified according to an aspect of the present invention parses the specified XML data file and load a data structure in the memory, with the data structure containing both the data elements and the corresponding XPaths. A pointer to the data structure is returned to the application.

The data structure may be designed to store the corresponding XPaths as well. Any convention can be used to store the XPaths, and applications need to be designed consistently. An example convention is described below with reference to lines 522 and 524.

Line 522 calls procedure traverse( ) and the corresponding code is provided in FIG. 5B. As described below, traverse( ) procedure operates to fill the xpaths data structure with the XPath of each data element, as well the data element. Lines 523-525 merely print the XPath values of the data elements for illustration, however, more complex business logic can be employed to use the received XPaths, as suitable for specific scenarios.

FIG. 5B contains the code outline for traverse( ) in one embodiment. In line 555, the XPath corresponding to the data element is accessed by the procedure/function called node.getXPath( ) and stored in the vector xpaths. Accordingly, DOM parser may need to be implemented to construct the XPath while parsing the XML data file, and making the XPath value available by getXPath( ) call. The implementation of such procedure calls will be apparent to one skilled in the relevant arts by reading the disclosure provided herein.

In lines 550-590, the parser traverses through each node in the DOM data structure and computes corresponding XPath expressions. As may be appreciated, there are various types of nodes in a DOM tree. The Node.DOCUMENT_NODE is the hook node from which the entire DOM tree follows. Node.ELEMENT_NODE represents an element tag. For example, for the XML portion <salutation>hello</salutation>, a node of the type ELEMENT_NODE would be created in the DOM tree for the tag salutation, and a node of the type TEXT_NODE would be created for the value hello. Line 571 would be executed when the current node is of type ELEMENT_NODE. At line 572, all the immediate children of the current node is collected in NodeList. Lines 581-583 recursively call the method traverse for every node collected in the NodeList.

Thus, using techniques such as those described above, XPath can be provided to applications in the context of DOM-type parsers. The description is continued with an illustration of pseudo-code implementation of an interface between an application and an event-based push parser according to the present invention.

7. Extensions to Event-Based Push Parser

FIG. 6 is shown containing Java Code for an application interfacing with a push based parser (e.g., SAX parser) according to an aspect of the present invention. As noted a parser in such an approach retrieves data in an XML data file without necessarily receiving a request for a next data element, and "pushes" the retrieved data element to the application (after the application has specified the identifier of the XML data file).

Lines 601, 603, 605 and 606 are respectively shown importing the classes available in source files java.xml.parsers.*, org.xml.sax.*, org.xml.sax.helpers.* and java.util.Vector.* respectively. Once imported, the classes in the source files can be referred to directly in the application code.

Line 607 defines class SAXParsingXPath2 as being public, and the corresponding body (of the class) is contained in lines 609-645, as shown. Class SAXParsingXPath2 represents an implementation of SAX Parser according to an aspect of the present invention which returns XPath corresponding to each data element as a parameter. It may be appreciated that the procedure may return XPath in addition to the attributes and values of the data element.

Line 615 initiates the execution of class SAXParsingXPath2 corresponding to lines 609-645. Line 609 causes execution of the code corresponding to lines 611-620. Line 611 initiates a new instance of the SAX Parser-Factory, and the corresponding handle is saved in variable spf.

Line 613 initiates a new instance of the SAX parser and the corresponding handle is saved in variable sp. Line 615 creates a handle (saved in variable handler) while executing the code corresponding to the class SAXParsingXPath2.

Line 616 specifies the file identifier of the XML data file to be parsed. Since the application is assumed to be interfacing with a push parser, the parsing operations begin in response to execution of line 616, and the data elements of the specified data file (here " . . . /something.xml") are made available. Lines 617-620 are shown printing the XPath for each data element, even though more complex business logic can process the XPaths.

Lines 621-627, 629-635 and 637-643 represent classes which obtain the XPaths provided by SAX parser according to various aspects of the present invention, add the XPaths to the variable vector (as indicated by lines 625 and 633), and process the corresponding attributes and XPath. As may be readily observed, XPath corresponding to a data element is shown obtained as a parameter value in each of lines 621, 629 and 637.

Accordingly, the SAX parser may need to be implemented to construct the XPath while parsing the XML data file, and provide the XPath value as a parameter with each class. The description is continued with an illustration of pseudo-code implementation of an interface between an application and an event-based pull parser in an embodiment of the present invention.

8. Extensions to Event-Based Pull Parser

FIG. 7 is shown containing Java Code for an application interfacing with a event based pull parser according to an aspect of the present invention. As noted, in such an approach an application requests the parser to retrieve each data element in an XML data file and the parser retrieves (e.g., from an XML document) the next data element (in sequential order) from the XML data file and provides the next data element to the application (after the application has specified the identifier of the XML data file).

Lines 701, 702, 703, and 704 are respectively shown importing the classes available in source files java.io.*, javax.xml.stream.*, javax.xml.stream.events.*, java.util.Vector.*. Once imported, the classes in the source files can be referred to directly in the application code.

Line 705 defines class PullParsingXPath as being public, and the corresponding body (of the class) is contained in lines 705-735, as shown. Class PullParsingXPath represents an implementation of event based PULL Parser according to an aspect of the present invention which returns XPath corresponding to each data element as a parameter.

Line 706 defines a variable 'xpaths' as a vector. The xpaths variable is then used to store XPath, as described below.

Line 708, application request the parser to begin parsing by providing the file identifier. Lines 709-710 begins parsing and retrieves data elements from the XML data file and a variable pullParser is defined to contain the data elements.

The program loop in lines 711-725, the parser determines XPath for each data element and adds the XPath value to the vector xpaths. Lines 715-724 illustrate the manner in which different business logic can be applied (even though only a print statement is shown in all cases, for simplicity) for different node-types. Similarly, the for loop of lines 730-732 prints the Xpaths in the vector xpaths. In general, a programmer may provide a desired business logic instead of the print statements.

It may be appreciated that the embodiments described above with respect to FIGS. 5A and 6 represents extensions to conventional parsers, in which XPath values are obtained as parameters. However, various aspects of the present invention can be implemented using other approaches as well. For example, new parsers providing custom application programming interfaces (API) may be implemented, as described below with an example.

9. Parsers with Custom API

FIGS. 8A-8F are shown containing tables illustrating the (names of) procedures (API) supported by an example parser in an embodiment of the present invention. FIGS. 8 and 9 respectively illustrate the manner in which the APIs of FIGS. 8A-8F can be used to implement applications according to various aspects of the present invention. Each of the FIGS. 8A-8F, 8 and 9 is described in further detail below.

Lines 811-817 of FIG. 8A indicate names of procedures accessible via XPathParserFactory API. The procedure of line 811 is used by an application to create an instance of the parser (811). The application can access procedures of push parser (line 812). The setFeature procedure of line 814 enables an application to assign a value to a property, as described below with reference to FIGS. 8 and 9 in further detail. The hasFeature procedure of line 813 checks whether a particular property is already set/initialized. The getFeature procedure of line 815 enables an application to retrieve a presently assigned value (and can be used after checking with hasFeature procedure).

The methods setProperty (line 816) and setFeature (line 814) in XpathParserFactory, set corresponding value for property and feature in the parser to the value passed during corresponding function calls. The methods are illustrated with examples below. However, the methods can be used with respect to other types of features and properties, as suited for the specific environment.

Lines 821-825 of FIG. 8B correspond to names of procedures that can be used by an application if push based parser is instantiated using the procedure call of line 812. The procedures of lines 821-825 are described with reference to FIG. 9 below.

Lines 841-844 of FIG. 8C contain names of procedures which are implemented in push based parser in one embodiment. The startDocument procedure of 841 opens an XML data file specified as a parameter, and (the file identifier) is generally provided by an application. Line 844 is shown indicating the name of the procedure, which may close the XML document after parsing of data elements is completed.

One of lines 842 and 843 is executed by the parser to provide the XPath value associated with each data element. The emit procedure of line 842 is used if the application had previously indicated that XPaths for the attributes need not be grouped and provided (by using the setFeature procedure of line 814) while providing the XPath of the associated data element. In such a case, separate XPaths are provided for each attribute of the data element. The emit procedure of line 843 is used otherwise, in which case the attributes are returned as values associated with the data element (along with the XPath).

The NamespaceResolver class of FIG. 8D is used to resolve the prefixes in the XPath expression to the namespace URIs. As may be appreciated, the elements in an XML document may or may not have namespaces, depending on how the XML document is created. The XPath expression for an element, which has a namespace should generally use a prefix, and the mapping of this prefix to the actual namespace of the node must be available in the NamespaceResolver, so that the XPath engine can use the NamespaceResolver to resolve the prefixes to namespace while evaluating the XPath expression.

For example, for the XML document:
<?xml version="1.0" ?>
<salutation xmlns="foo">hello</salutation>
the element—salutation, has a namespace URI=foo. The XPath expression for this element is "/pfx:salutation" and not "/salutation", wherein the prefix pfx could be any name and not necessarily always be pfx. The expr "/salutation" is incorrect because, the element salutation in the XML document has a namespace URI, and "/salutation" would mean to look for the element named salutation which has no namespace.

Now, for the XPath engine to be able to evaluate the expr "/pfx:salutation" correctly, the prefix—pfx must have been bound to some namespace, and there must be a mechanism by which the XPath engine can resolve the prefix to a namespace URI. The XPathPushParser, while parsing the XML document, would bind the prefixes used in the XPath expr to the correct namespace URIs in the NamespaceResolver. This NamespaceResolver would then be made available to the XPath engine to evaluate the XPath expression correctly.

For the example noted above, when the XPathPushParser reports the xpath as "/pfx:salutation", the application code can use the NamespaceResolver in the following way to resolve the namespace URI:
String ns=resolver.resolveNamespacePrefix("pfx");
The value of the variable "ns" would be "foo".

When a feature http://xpath-parser/features/group-attributes is set to true, the XPath of all the attributes with their corresponding values, if any, on an element, would be grouped together as XPathAttributes (FIG. 8E) and reported alongwith the XPath of the element using the method emit (String xpath, String xpath Val, int eventType, XPathAttributes attrs, NamespaceResolver nsResolver).

For every attribute found, the XPath expression of the attribute and the value of the attribute is used to create the function XpathAttribute of FIG. 8F. The set of all such XPathAttribute functions can then be accessed from the function XpathAttributes using the function as follows:

```
public void emit(String xpath, String xpath Val, int event-
    Type, XPathAttributes attrs, NamespaceResolver nsRe-
    solver) {
  if (attrs !=null) {
    int len=attrs.getLength( );
    for (int i=0; i<len; i++) {
      XPathAttribute attribute=attrs.item(i);
      System.out.println("Attr   XPath="+attribute.getX-
         Path( ));
      System.out.println("Attr            XPath="+at-
         tribute.getValue( ));
    }
  }
}
```

The implementation of the procedures of FIGS. 8A-8F will be apparent to one skilled in the relevant arts by reading the disclosure provided herein. The description is continued with respect to the manner in which applications can be implemented using the custom API thus provided.

10. Applications Using Parsers with Custom API

FIG. 9 is shown containing Java code of an application using procedures related to event based parsing using the API described above with reference to FIGS. 8A-8C and 8E-8F. Lines 901-904 respectively import javax.xml.parsers.*, org.xml.sax.*, org.xml.sax.helpers.* and java.util.Vector libraries.

Line 905 defines class PushParsingXPath as being public, and the corresponding body (of the class) is contained in lines 907-933. Class PushParsingXPath represents an implementation of an event-based parser, which returns XPath corresponding to each data element according to an aspect of the present invention.

Line 906 defines a variable 'xpaths' as a vector. The xpaths variable is then used to store XPath, as described below.

Line 908 is shown initializing an instance of XPathParserFactory and the corresponding handle is stored in a variable xpf to enable access to procedure names indicated by lines 811-817 of FIG. 8A.

Line 909 is shown initializing an instance of XPath based PUSH parser, and the corresponding handle is stored in a variable xpp, which enables the application to access corresponding procedures of 821-825.

Line 910 indicates to the parser that the XPaths are to be provided in a non-abbreviated format, consistent with the definition of the procedure call of line 814. As a result, each XPath is provided with the beginning of the XML data file as the root (e.g., as depicted in column 1020 of FIG. 10A). On the other hand, if the value were set to true, the XPath are provided in abbreviated format, in which each XPath is defined with reference to a present node.

Continuing with reference to FIG. 9, setFeature procedure of line 911 requests the parser to provide XPath of attributes corresponding to a data element while parsing the XML data file by executing either of the emit procedures indicated by the lines 921-925 and 927-933.

Lines 912 and 913 initialize the application to process data elements provided by the parser (by the emit statement, noted above in line 842 and 843 of FIG. 8C) and the corresponding handle is stored in variable xpcHandler.

Lines 914 and 915 together enable application to report any errors, which may occur during processing in the application. The corresponding handle is stored in a variable xpeHandler. In Line 917, application provides the file identifier for XML data file to the parser.

In line 919, the parser begins parsing of XML data file and procedures of FIGS. 8C, 8E and 8F are executed. In particular, as noted above, one of the emit statements of lines 842 and 843 is executed depending on the value of the attributes parameter, which is set to true in line 911. Thus, the statement of line 843 would be executed due to the set value.

The code of lines 921-925 and 927-931 respectively inherit the emit classes of lines 842 and 843. The xpaths.add( ) procedure is executed by each of the emit classes. However, more complex business logic can be employed, as will be apparent to one skilled in the relevant arts.

It may be observed that the above application is implemented with push parsers. FIG. 10A illustrates the XPaths and values returned by the parser, as described briefly below.

FIG. 10A is a table containing three columns node (data element) 1010, XPath 1020 an value 1030. The three columns illustrate the XPath and value returned for each data element when the attribute feature is set to true. Rows 1022-1033 correspond to each data element of the XML data file of FIG. 4A. In particular, row 1024 indicates that the XML parsers of FIGS. 8A-8F would provide XPath of "/Books/Book[1]/@isbn" and a value of '123' for the attribute 'ISBN=123' shown in line 403 of FIG. 4A. Similarly, as may be readily observed, lines 1028 and 1032 also contain data elements corresponding to attributes (of lines 407 an 411 of FIG. 4A respectively).

FIG. 10B is a table illustrating the operation of the parser when the attribute feature is set to false. Columns 1051-54 respectively represent node (i.e., data element), XPath, corresponding Value and XPathAttributes, as shown. Thus, the parser may provide the data represented by rows 1061-1071 to the application. As may be appreciated, in such a case, the parser does not report the XPath for the attributes in such a scenario.

In comparison to FIG. 10A, it may be readily noted that XPaths are not provided for attributes in rows 1024, 1028 and 1032. However, the same attribute values are provided as parameters as indicated in rows 1063, 1066 and 1069 of FIG. 10B.

It may be further noted that the XPaths of FIGS. 10A and 10B are shown in non-abbreviated format since the abbreviated feature is set to false in lines 810 and 907 respectively. However, by setting the abbreviated feature to true, the XPaths can be provided in the abbreviated format, and the corresponding XPaths are depicted in FIG. 10C. The table of FIG. 10D depicts the Xpaths corresponding to a case in which abbreviated feature and attributes feature are both set to false.

The description is continued with reference to an embodiment in which the above features are implemented in the form of software instructions executing on a digital processing system.

11. Software-Driven Implementation

Figure 11:
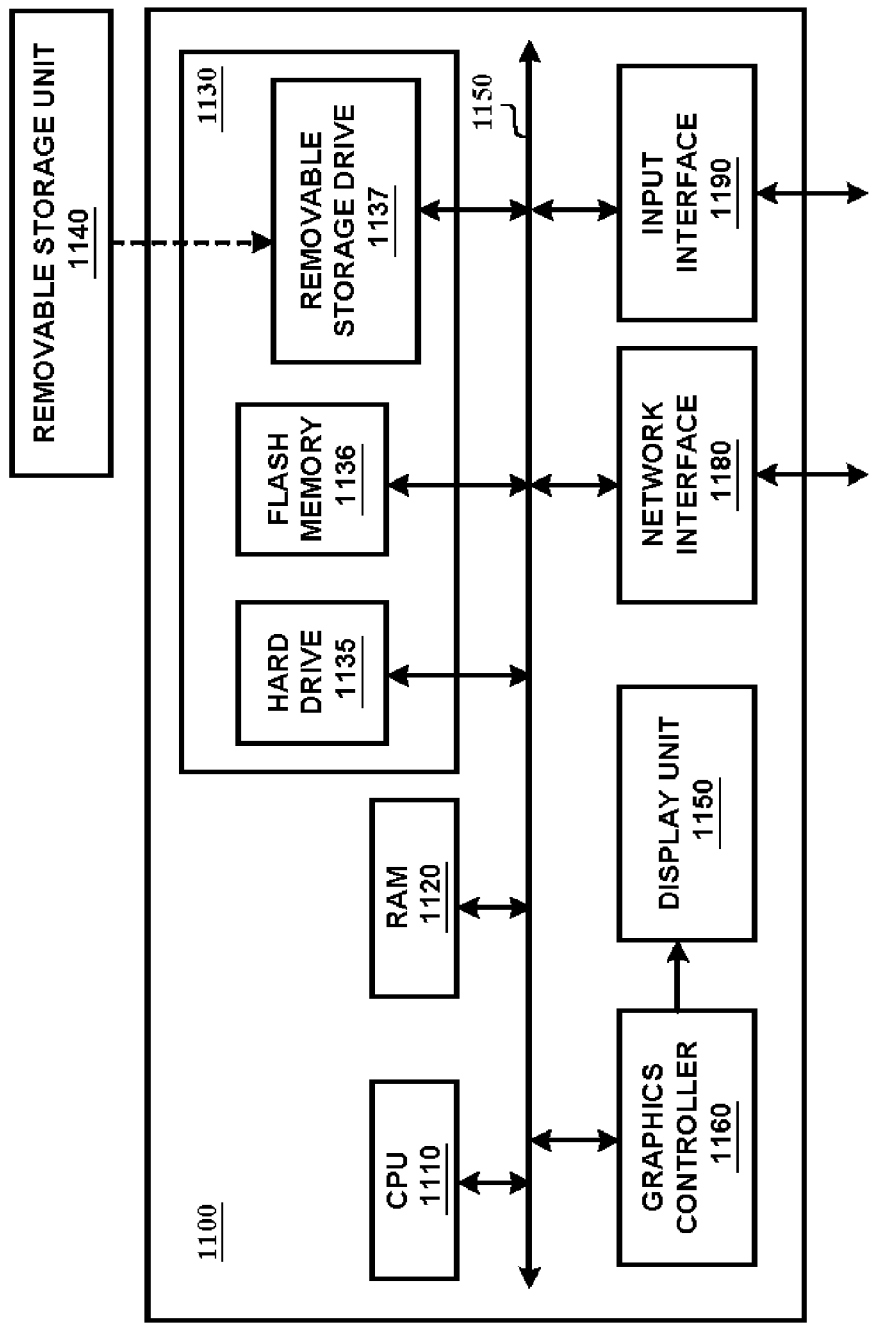
FIG. 11 illustrates the manner in which the present invention may be implemented in the form of a software.

FIG. 11 is a block diagram illustrating the details of how various aspects of the invention may be implemented substantially in the form of software in an embodiment of the present invention. System 1100 may contain one or more processors such as central processing unit (CPU) 1110, random access memory (RAM) 1120, secondary memory 1130, graphics controller 1160, display unit 1170, network interface 1180, and input interface 1190. All the components except display unit 1170 may communicate with each other over communication path 1150, which may contain several buses as is well known in the relevant arts. The components of FIG. 11 are described below in further detail.

CPU 1110 may execute instructions stored in RAM 1120 to provide several features of the present invention. For example, the instructions may implement one or both of parsers and applications, described above. CPU 1110 may contain only a single general purpose-processing unit or several processing units. RAM 1120 may receive instructions from secondary memory 1130 using communication path 1150.

Graphics controller 1160 generates display signals (e.g., in RGB format) to display unit 1170 based on data/instructions received from CPU 1110. Display unit 1170 contains a display screen to display the images defined by the display signals. Input interface 1190 may correspond to a keyboard and/or mouse. Graphics controller 1160 and input interface 1190 may enable a user to interact directly with system 1100.

Secondary memory 1130 may contain hard drive 1135, flash memory 1136 and removable storage drive 1137. Secondary memory 1130 may store the data and software instructions, which enable system 1100 to provide several features in accordance with the present invention. Some or all of the data and instructions may be provided on removable storage unit 1140, and the data and instructions may be read and provided by removable storage drive 1137 to CPU 1110. Floppy drive, magnetic tape drive, CD-ROM drive, DVD Drive, Flash memory, removable memory chip (PCMCIA Card, EPROM) are examples of such removable storage drive 1137.

Removable storage unit 1140 may be implemented using medium and storage format compatible with removable storage drive 1137 such that removable storage drive 1137 can read the data and instructions. Thus, removable storage unit 1140 includes a computer readable storage medium having stored therein computer software and/or data.

In this document, the term "computer program product" is used to generally refer to removable storage unit 1140 or hard disk installed in hard drive 1135. These computer program products are means for providing software to system 1100. CPU 1110 may retrieve the software instructions, and execute the instructions to provide various features of the present invention as described above.

12. Conclusion

While various embodiments of the present invention have been described above, it should be understood that they have been presented by way of example only, and not limitation.

Thus, the breadth and scope of the present invention should not be limited by any of the above-described example embodiments, but should be defined only in accordance with the following claims and their equivalents.

What is claimed is:

1. A method of processing data elements represented according to a markup language, said method comprising:
   receiving, in a parser, a file identifier of a data file with an instruction to parse said data file from an application implemented external to said parser, said data file containing a plurality of data elements, wherein said parser is an event-based parser;
   retrieving, by said parser, each of said plurality of data elements from said data file, wherein said plurality of data elements are retrieved sequentially from said data file;
   for each of the retrieved data elements:
   determining, in said parser, a corresponding portion identifier of the retrieved data element, wherein said corresponding portion identifier indicates a relative path of the retrieved data element with respect to another data element in said data file according to said markup language, said relative path identifying one or more data elements between the retrieved data element and said another data element according to said markup language; and
   providing, by said parser to said application, the retrieved data element and said corresponding portion identifier of the retrieved data element in association,
   wherein said corresponding portion identifier is provided to said application, in the form of a string representing said relative path such that said application receives said string,
      wherein said parser provides said plurality of data elements and respective portion identifiers, in association, as a response to said instruction,
   wherein said event-based parser performs said determining and said providing as each of said plurality of data elements is sequentially retrieved, without waiting for completion of said retrieving of all of said plurality of data elements.

2. The method of claim 1, wherein said markup language comprises XML and said corresponding portion identifier of the retrieved data element comprises an XPath representing said relative path of the retrieved data element from said another data element.

3. The method of claim 1, wherein said providing provides said corresponding portion identifier and the retrieved data element according to an application programming interface (API), wherein said application obtains said corresponding portion identifier and the retrieved data element by using one or more procedure calls according to said API.

4. The method of claim 3, wherein said API is defined to provide said corresponding portion identifier and the retrieved data element as respective parameters of a single procedure call.

5. The method of claim 3, wherein said API provides a procedure for said application to request that said XPath is to be provided either in abbreviated or non-abbreviated format.

6. The method of claim 3, wherein said API provides a procedure for said application to request that attributes related to the retrieved data element are to be returned as XPaths.

7. The method of claim 3, wherein said API provides a procedure for said application to request that attributes related to the retrieved data element are to be returned as values associated with the retrieved data element.

8. The method of claim 3, wherein said parsing is performed according to a push parsing approach, wherein said API provides a procedure for said parsing to provide said Xpath to said application.

9. The method of claim 8, wherein said API allows said application to set a variable to a value to cause said procedure to provide attributes of said data element along with said XPath.

10. The method of claim 1, wherein said retrieving retrieves successive data elements from said data file, wherein said determining determines the portion identifier for all of the data elements in said data file, wherein each portion identifier is determined based on a hierarchy in which the data element is present according to said markup language, and wherein the portion identifier is determined upon retrieval of the corresponding data element from said data file.

11. The method of claim 10, wherein said providing provides each data element and corresponding portion identifier to said application before said retrieving retrieves a next data element from said data file.

12. The method of claim 1, wherein said relative path comprises a hierarchical path from a root data element contained in said plurality of data elements, wherein said root data element occurs at the beginning of said data file.

13. A method implemented in an application, said method comprising:
   instructing a parser to parse a data file of interest, said data file containing a plurality of data elements represented according to a markup language, said parser being implemented external to said application, wherein said parser is an event-based parser;
   obtaining said plurality of data elements from said parser in response to said instructing, wherein each of said plurality of data elements is obtained in association with a corresponding portion identifier of the obtained data element,
   wherein said corresponding portion identifier indicates a relative path of the obtained data element with respect to another data element in said data file according to said markup language, said relative path identifying one or more data elements between the obtained data element and said another data element according to said markup language,
   wherein said obtaining comprises receiving, by said application, said corresponding portion identifier in the form of a string representing said relative path; and
   processing the obtained data elements and said corresponding portion identifiers,
   wherein said markup language comprises XML and said corresponding portion identifier of the retrieved data element comprises an XPath representing said relative path of the retrieved data element from said another data element.

14. The method of claim 13, wherein said obtaining obtains said corresponding portion identifier and associated one of said plurality of data elements according to an application programming interface (API).

15. The method of claim 14, wherein said API is defined to provide said corresponding portion identifier and the associated data element as respective parameters of a single procedure call.

16. The method of claim 14, wherein said API provides a procedure for said application to request that said XPath is to be provided either in abbreviated or non-abbreviated format.

17. The method of claim 14, wherein said API provides a procedure for said application to request that attributes related to each of said plurality of data elements are to be returned as corresponding XPaths.

18. The method of claim 14, wherein said API provides a procedure for said application to request that attributes related to each of said plurality of data elements are to be returned as values associated with the obtained data element.

19. A non-transitory computer readable medium carrying one or more sequences of instructions causing a digital processing system to process data elements represented according to a markup language, wherein execution of said one or more sequences of instructions by one or more processors contained in said digital processing system causes said digital processing system to perform the actions of:
receiving, in a parser, a file identifier of a data file with an instruction to parse said data file from an application implemented external to said parser, said data file containing a plurality of data elements, wherein said parser is an event-based parser;
retrieving, by said parser, each of said plurality of data elements from said data file, wherein said plurality of data elements are retrieved sequentially from said data file;
for each of the retrieved data elements:
setting, in said parser, a corresponding portion identifier of the retrieved data element to equal a relative path of the retrieved data element with respect to another data element in said data file according to said markup language, said relative path identifying one or more data elements between the retrieved data element and said another data element according to said markup language; and
providing, by said parser to said application, said portion identifier and the retrieved data element in association, wherein said corresponding portion identifier is provided to said application, in the form of a string representing said relative path such that said application receives said string,
wherein said parser provides said plurality of data elements and respective portion identifiers, in association, as a response to said instruction,
wherein said event-based parser performs said determining and said providing as each of said plurality of data elements is sequentially retrieved, without waiting for completion of said retrieving of all of said plurality of data elements.

20. The computer readable medium of claim 19, wherein said markup language comprises XML and said corresponding portion identifier of the retrieved data element comprises an XPath representing said relative path of the retrieved data element from said another data element.

21. The computer readable medium of claim 19, wherein said providing provides said corresponding portion identifier and the retrieved data element according to an application programming interface (API), wherein said application obtains said corresponding portion identifier and the retrieved data element by using one or more procedure calls according to said API.

22. The computer readable medium of claim 21, wherein said API is defined to provide said corresponding portion identifier and the retrieved data element as respective parameters of a single procedure call.

23. The computer readable medium of claim 21, wherein said API provides a procedure for said application to request that said XPath is to be provided either in abbreviated or non-abbreviated format.

24. The computer readable medium of claim 21, wherein said API provides a procedure for said application to request that attributes related to the retrieved data element are to be returned as XPaths.

25. The computer readable medium of claim 21, wherein said API provides a procedure for said application to request that attributes related to the retrieved data element are to be returned as values associated with the retrieved data element.

26. The computer readable medium of claim 21, wherein said parsing is performed according to a push parsing approach, wherein said API provides a procedure for said parsing to provide said Xpath to said application.

27. The computer readable medium of claim 26, wherein said API allows said application to set a variable to a value to cause said procedure to provide attributes of said data element along with said XPath.

28. The computer readable medium of claim 19, wherein said retrieving retrieves successive data elements from said data file, wherein said determining determines the portion identifier for each of said data elements in said data file upon retrieval of the data element based on a hierarchy in which the data element is present according to said markup language.

29. The computer readable medium of claim 28, wherein said providing provides each data element and corresponding portion identifier to said application before said retrieving retrieves a next data element from said data file.

30. A non-transitory computer readable medium carrying one or more sequences of instructions causing a digital processing system to implement an application using data contained in a data file, said data file containing data according to a markup language, wherein execution of said one or more sequences of instructions by one or more processors contained in said digital processing system causes said one or more processors to perform the actions of:
instructing a parser to parse said data file of interest, wherein said parser is an event-based parser;
obtaining in association both a portion identifier and a data element from said parser, wherein said portion identifier identifies said data element in said data file according to said markup language, said data element being contained in said plurality of data elements; and
processing said data element and said portion identifier, wherein said markup language comprises XML and said portion identifier comprises XPath.

31. The computer readable medium of claim 30, wherein said obtaining obtains said portion identifier and said first data element according to an application programming interface (API).

32. The computer readable medium of claim 31, wherein said API is defined to provide said portion identifier and said first data element as respective parameters of a single procedure call.

33. The computer readable medium of claim 31, wherein said API provides a procedure for said application to request that said XPath is to be provided either in abbreviated or non-abbreviated format.

34. The computer readable medium of claim 31, wherein said API provides a procedure for said application to request that attributes related to said first data element are to be returned as XPaths.

35. The computer readable medium of claim 31, wherein said API provides a procedure for said application to request that attributes related to said first data element are to be returned as values associated with said first data element.

36. The computer readable medium of claim 30, wherein said obtaining obtains each of said plurality of data elements associated with the corresponding portion identifier from said parser.

37. A digital processing system comprising:
  an application and an event based parser, wherein said parser is implemented external to said application such that multiple applications can use said parser,
  wherein said application is designed to instruct said event based parser to parse a data file of interest, said data file contains a plurality of data elements,
  in response, said parser designed to retrieve each of said plurality of data elements from said data file, wherein said plurality of data elements are retrieved sequentially from said data file, for each retrieved data element said parser operable to:
  determine a corresponding portion identifier of the retrieved data element, wherein said corresponding portion identifier indicates a relative path of the retrieved data element with respect to another data element in said data file according to said markup language, said relative path identifying one or more data elements between the retrieved data element and said another data element according to said markup language; and
  provide to said application, the retrieved data element and said corresponding portion identifier of the retrieved data element in association,
  wherein said corresponding portion identifier is provided to said application, in the form of a string representing said relative path such that said application receives said string,
    wherein said parser provides said plurality of data elements and respective portion identifiers, in association, as a response to said instruction,
  wherein said event-based parser performs said determine and said provide as each of said plurality of data elements is sequentially retrieved, without waiting for completion of said retrieving of all of said plurality of data elements
  said parser to set a corresponding portion identifier of each of said plurality of data elements to equal a relative location of the data element with respect to another data element in said data file according to said markup language,
  said parser to provide in association each of said plurality of data elements and corresponding portion identifier to said application as a corresponding one of a sequence of events without receiving a request for next data element from said application,
  wherein each of said application and said parser is implemented by one or more processors retrieving and execution instructions from one or more memories.

* * * * *

UNITED STATES PATENT AND TRADEMARK OFFICE
CERTIFICATE OF CORRECTION

| | |
|---|---|
| PATENT NO. | : 8,918,710 B2 |
| APPLICATION NO. | : 10/711791 |
| DATED | : December 23, 2014 |
| INVENTOR(S) | : Srivastava |

It is certified that error appears in the above-identified patent and that said Letters Patent is hereby corrected as shown below:

In the Drawings

On sheet 5 of 17, in figure 4B, under Reference Numeral 430, line 1, delete "Autho" and insert -- Author --, therefor.

In the Specification

In column 3, line 60, delete ""Java™." and insert -- "Java™". --, therefor.

In column 6, line 53, delete "traverse( )" and insert -- traverse( ), --, therefor.

In column 6, line 64, delete ".getXPath( )" and insert -- .getXPath( ), --, therefor.

Signed and Sealed this
Fourth Day of August, 2015

Michelle K. Lee
*Director of the United States Patent and Trademark Office*